United States Patent
Ingemarsson

(10) Patent No.: US 7,128,343 B2
(45) Date of Patent: Oct. 31, 2006

(54) SAFETY-BELT ARRANGEMENT

(75) Inventor: Anders Ingemarsson, Kungsbacka (SE)

(73) Assignee: Autoliv ASP,Inc., Vargarda (SE)

( * ) Notice: Subject to any disclaimer, the term of this patent is extended or adjusted under 35 U.S.C. 154(b) by 396 days.

(21) Appl. No.: 10/467,195

(22) PCT Filed: Jan. 25, 2002

(86) PCT No.: PCT/SE02/00120

§ 371 (c)(1),
(2), (4) Date: Nov. 20, 2003

(87) PCT Pub. No.: WO02/062631

PCT Pub. Date: Aug. 15, 2002

(65) Prior Publication Data

US 2004/0066027 A1   Apr. 8, 2004

(30) Foreign Application Priority Data

Feb. 6, 2001 (GB) ................................. 0102926.3
Jun. 12, 2001 (GB) ................................. 0114285.0

(51) Int. Cl.
B60R 22/405 (2006.01)
(52) U.S. Cl. ...................................... 280/805; 280/806
(58) Field of Classification Search ................ 280/805, 280/806; 279/470, 476, 479; 242/379.1, 242/382

See application file for complete search history.

(56) References Cited

U.S. PATENT DOCUMENTS

| 3,918,545 | A |   | 11/1975 | Andres et al. |
| 4,655,312 | A | * | 4/1987  | Frantom et al. ............ 180/268 |
| 5,224,736 | A | * | 7/1993  | Sedlmayr et al. ........... 280/807 |
| 5,552,986 | A | * | 9/1996  | Omura et al. .................. 701/45 |
| 5,607,118 | A |   | 3/1997  | Dybro et al. |
| 5,667,246 | A | * | 9/1997  | Miller, III .................... 280/806 |
| 5,700,034 | A |   | 12/1997 | Lane, Jr. |
| 5,785,347 | A |   | 7/1998  | Adolph et al. |
| 5,799,893 | A | * | 9/1998  | Miller et al. ............. 242/379.1 |
| 5,820,056 | A |   | 10/1998 | Dybro et al. |
| 5,873,599 | A |   | 2/1999  | Bauer et al. |
| 6,053,532 | A |   | 4/2000  | Wilkins et al. |
| 6,209,916 | B1| * | 4/2001  | Smithson et al. ........... 280/805 |

(Continued)

FOREIGN PATENT DOCUMENTS

DE   38 28 072   11/1989

(Continued)

Primary Examiner—David R. Dunn
Assistant Examiner—Drew J. Brown
(74) Attorney, Agent, or Firm—Madson & Austin

(57) ABSTRACT

A safety-belt arrangement for use in a motor vehicle has a safety-belt (5), one end of which is connected to a retractor (8), a sensor (11) generates a signal representative of the amount of safety-belt paid-out from the retractor. A force limiter (10) is associated with the retractor to permit safety-belt to be paid-out with a variable force limiting effect. A control arrangement (12) changes the level of force applied by the force limiter (10) by determining a reference point either by measuring a period of time following sensing of a predetermined parameter relating to a crash, and then determining when a specific length of safety-belt has been paid-out, or by sensing when the first level of resistive force is applied by the force limiter, and optionally then determining when a predetermined length of safety-belt has been paid-out, the control arrangement then measuring a predetermined period of time after the reference point has been reached before effecting the change of level of force applied by the force limiter (10).

16 Claims, 3 Drawing Sheets

U.S. PATENT DOCUMENTS

| | | | |
|---|---|---|---|
| 6,290,159 B1 * | 9/2001 | Specht et al. | 242/379.1 |
| 6,513,616 B1 * | 2/2003 | Bacher et al. | 180/268 |
| 6,616,081 B1 * | 9/2003 | Clute et al. | 242/379.1 |
| 6,705,559 B1 | 3/2004 | Sullivan et al. | |
| 6,726,249 B1 * | 4/2004 | Yano et al. | 280/805 |
| 6,834,822 B1 * | 12/2004 | Koning et al. | 242/379.1 |
| 6,871,877 B1 * | 3/2005 | Herrmann et al. | 280/805 |
| 6,908,112 B1 * | 6/2005 | Yano et al. | 280/805 |
| 6,969,022 B1 * | 11/2005 | Bell et al. | 242/379.1 |
| 2003/0201357 A1 * | 10/2003 | Koning et al. | 242/379.1 |
| 2005/0284978 A1 * | 12/2005 | Zolkower | 242/382.4 |

FOREIGN PATENT DOCUMENTS

| | | |
|---|---|---|
| DE | 199 56 530 | 6/2000 |
| DE | 199 22 720 | 11/2000 |
| DE | 199 27 427 | 1/2001 |
| EP | 0 656 283 | 6/1995 |
| EP | 0 878 364 | 11/1998 |
| EP | 1 060 961 | 12/2000 |
| EP | 1 149 743 | 10/2001 |
| EP | 1 022 201 | 7/2003 |
| JP | 11-147450 | 6/1999 |
| WO | WO 96/04154 | 2/1996 |
| WO | WO 00/38958 | 7/2000 |

* cited by examiner

SAFETY-BELT ARRANGEMENT

BACKGROUND OF THE INVENTION

1. Field of the Invention

The present invention relates to a safety-belt arrangement, and more particularly relates to a safety-belt arrangement intended for use in a motor vehicle.

2. Description of Related Art

A simple safety-belt arrangement, as in widespread use, comprises a lap-and-diagonal safety-belt arrangement, (or "three-point" safety-belt) with one end of the safety-belt being anchored to part of the vehicle, an intermediate part of the safety-belt being provided with a tongue releasably engageable with a fixed buckle, and the other end of the safety-belt, which may pass through a pillar-loop, being wound on to the spindle of a retractor. The retractor incorporates a mechanism which locks the spindle of the retractor to prevent further safety-belt being paid out from the retractor when an accident or a potential accident situation is sensed. If the safety-belt is locked in this way, however, the safety-belt can, in certain circumstances, apply a very great retarding force to the occupant of the vehicle, decelerating the occupant very swiftly, and also possibly injuring the occupant.

Thus it has been proposed to provide a force limiter in a safety-belt system, the force limiter being adapted to enable a certain length of safety-belt to be paid-out, with a force limiting or energy absorbing effect, when very high forces are applied to the safety-belt.

It has been proposed to provide an arrangement in which the force limiting effect can be varied, at the start of or during an accident situation, in dependence upon the load required to be absorbed by the safety-belt. An arrangement of this type is disclosed in WO 9749583-A in which the reel of a retractor is provided with a torsion element arrangement which provides the force limiting effect. The torsion element arrangement includes an axially extending torsion bar and a co-axial torsion sleeve. The torsion bar and the torsion sleeve each terminate with a portion having a respective toothed periphery which can be releasably engaged by a respective ratchet element. In this way the level of force of the force limiting effect can be selected, by selecting either the bar, or the sleeve, or both, to provide the force limiting effect.

It is desirable, in a typical accident situation, for the force limiter to provide a high force limiting effect during the initial stages of the accident, as the occupant of the seat begins to move forwardly relative to the chassis of the vehicle, and to provide a lower force limiting effect at a subsequent stage in the accident when the occupant has moved forwardly and begins to impact with an inflating air-bag. It has, therefore, been proposed to have an arrangement in which the force level (or energy absorbing level) of the force limiter is adjusted after a predetermined period of time has elapsed following the sensing of an accident or a potential accident situation, and thus after the pretensioner has been triggered. However, an arrangement of this type suffers from various disadvantages.

Many accidents start with minor or short interaction with a first object, such as an impact with a car having a relatively low speed, or an impact with the edge of the road, or a crash barrier, with this minor or short interaction being followed, some moments later, by a severe impact with a second object, such as an on-coming high speed car, a tree or a building. In such a situation the first interaction would be sensed by the sensor provided in the motor vehicle to detect an accident or a potential accident situation. The sensor may control various safety devices within the motor vehicle, such as a pre-tensioner and an air-bag, but would also start the operation of the timer associated with the force limiter.

In an accident of this type, the force limiter would exhibit a high level of force for a period of time following the minor or short interaction, but the occupant of the vehicle may not move forwardly at all, or may move forwardly only by a very short distance during this period of time. Before the severe impact with the second object, the timer may have timed-out, and thus the force limiter would only have the lower level of force. Then, when the severe impact occurs, which will cause the occupant to move forwardly, relative to the chassis, the level of force provided by the force limiter might well be too low to absorb all of the energy of the occupant before the occupant hits the steering wheel or the dashboard.

SUMMARY OF THE INVENTION

The present invention seeks to provide an improved safety-belt arrangement.

According to this invention there is provided a safety-belt arrangement for use in a motor vehicle, the safety-belt arrangement comprising a safety-belt, one end of which is connected to a retractor, a sensor adapted to generate a signal representative of the amount of the safety-belt paid-out from the retractor, a force limiter associated with the retractor adapted to permit the safety-belt to be paid-out with a variable force limiting effect, means to change the level of force applied by the force limiter, between a first level of resistive force and a second level of resistive force, and a control unit to generate an output signal to control the means which change the level of force, the arrangement determining a reference point either by measuring a period of time following sensing of a predetermined parameter relating to a crash, and then determining when a specific length of safety-belt has been paid-out, or by sensing when the first level of resistive force is supplied by the force limiter and optionally then determining when a predetermined length of safety-belt has been paid-out and, after the reference point has been determined, measuring a predetermined period of time after the reference point has been reached before said output signal is generated.

The predetermined parameter relating to a crash may be a deceleration or a predetermined deceleration, or some other equivalent parameter indicative of a crash, or a crash of a predetermined severity, is occurring.

By changing the force level at the end of the predetermined period of time, the energy absorbed will be adapted to the weight of the occupant and/or the violence of the crash.

Preferably the retractor incorporates a pretensioner.

In one embodiment of the invention responsive to the tension present in the safety-belt are provided to determine the instant when the force limiter begins to provide the first level of resistive force.

In an alternative embodiment of the invention means responsive to a predetermined movement of components in the force limiter.

Preferably the force limiter is a torsion element force limiter and the determining means determine when a torsion element in the force limiter yields.

In a further alternative embodiment of the invention means responsive to a predetermined pay-out rate of safety-belt.

Conveniently the reference point is determined by sensing when the first level of resistive force is applied by the force limiter and then determining when a predetermined length of safety-belt has been paid-out.

Advantageously a sensor is provided to determine the severity of the crash.

Alternatively a sensor is provided to determine the severity of the crash and the magnitude of the predetermined period of time is selected in dependence on the sensed severity of the crash.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
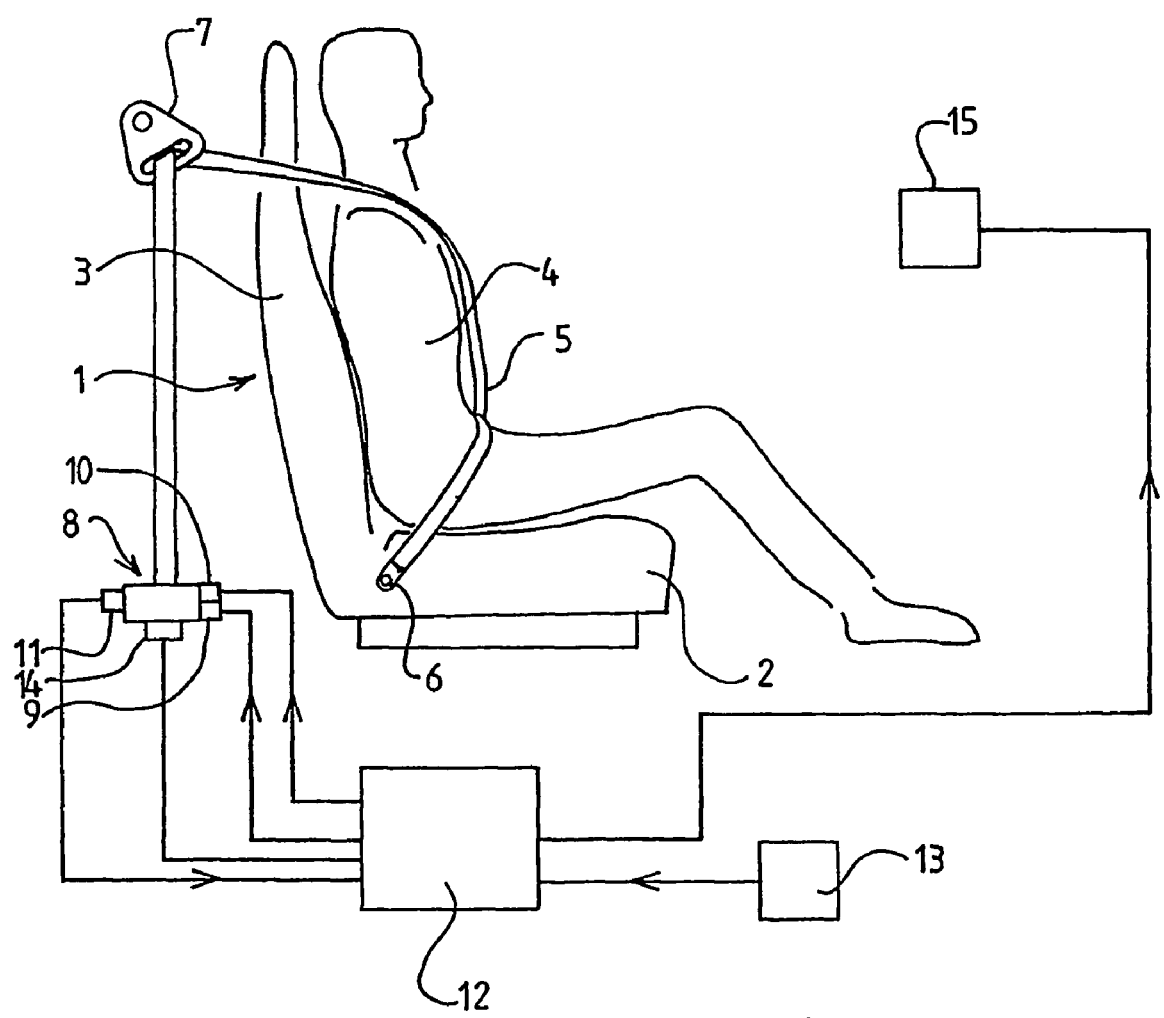
FIG. 1 is a diagrammatic figure illustrating one embodiment of the invention.

Referring initially to FIG. 1 of the accompanying drawings, a vehicle seat 1 having a seat squab 2 and a back-rest 3 is illustrated. The seat is occupied by an occupant 4. The occupant 4 is illustrated wearing a safety-belt that forms a safety-belt arrangement in accordance with the invention. The safety-belt comprises a webbing strap, one end of which is anchored to part of the vehicle seat. Not shown in FIG. 1 is a tongue which is mounted on the safety-belt and which is engaged releasably in a buckle provided on the other side of the seat. Part of the safety-belt 5 passes through a pillar-loop 7, and the other end of the safety-belt is connected to a floor mounted retractor 8. The retractor 8 is adapted to respond to an accident situation to lock a spool within the retractor to prevent further safety-belt being paid-out from the retractor, by locking in response to a sensed parameter such as a predetermined deceleration of the vehicle and/or in response to the speed of withdrawal of the safety-belt from the retractor. The retractor is provided with a pretensioner 9 which is adapted, in response to an accident situation being sensed, to rotate the spool of the retractor to wind in part of the safety-belt. Safety-belt arrangements having the features described above are well known and in common use. However, in this invention alternative mechanisms which lock the safety-belt in response to a sensed parameter may be used.

In the described embodiment the retractor 8 incorporates a variable force limiter 10. The force limiter 10 may be a variable force limiter which provides a plurality of discrete force levels, such as a torsion element force limiter of the type disclosed in WO 9749583-A, as described above.

The retractor 8 may be provided with a sensor 11 adapted to sense the amount of safety-belt that has been withdrawn from the retractor. Various types of sensors which perform this function have been proposed before, and any of these sensors may be used. EP 0 723 895 A discloses an arrangement in which a gear train is provided, driven by the spool of a retractor, which causes the rotation of an element which has a part spiral outer edge. A sensor has a spring-biased probe which engages the part spiral outer edge, so that as safety-belt is withdrawn from the retractor, the element with the part spiral outer edge rotates and the degree of movement of the probe is indicative of the length of safety-belt that has been withdrawn. In another prior proposed arrangement, an element which co-rotates with the spool is provided with a plurality of evenly spaced markings which are sensed by an optical sensor. The optical sensor generates a discrete pulse for each marking that passes the sensor. Appropriate circuitry connected to the sensor can determine the length of safety-belt that has been paid-out by determining the number of rotations, or part rotations, of the spool. A Hall effect sensor can also be used to determine the rotations of the spool when the spool is provided with a number of appropriately located magnets.

The output from the sensor 11 is provided to a central control unit 12. The central control unit 12, in the described embodiment, also receives signals from other sources. The control unit 12 thus receives signals from an accident sensor 13 in the form of an accelerometer. The accelerometer provides an output signal whenever deceleration in excess of a predetermined threshold is sensed. The accelerometer may also provide a signal which indicates the severity of the crash. Such an accident sensor 13 is conventional. The central unit 12 also receives a signal from a sensor 14 adapted to sense when the first level $F_2$ is reached. The sensor may sense the relative movement of components in the force limiter 10, such as means which sense when a torsion element yields. Alternatively, the sensor may sense the tension in the safety-belt, or the speed of withdrawal of the belt from the retractor.

In the presently described embodiment, the control unit 12 is adapted to control not only the pre-tensioner and the force limiter, but also an air-bag 15, which is located in front of the occupant.

Whilst, in the described embodiment, the single control unit 12 controls a number of different items, in alternative embodiments of the invention, the control function may be divided up between a number of different independent control units.

As will become clear from the following description, in a safety-belt arrangement in accordance with the invention, a variable force limiting effect is provided, with the variation in the force limiting effect being controlled a predetermined time after a reference point has been reached. The reference point may be a predetermined time after the initial sensing of a crash, or a predetermined time after a specific deceleration is reached during a crash, or when a specific predetermined length of safety-belt has been paid-out after either of these predetermined times. Alternatively the reference point may be reached when a specific length of safety-belt has been paid-out, after a first retarding force provided by the force limiter has been reached. Alternatively again, the reference point may simply be the point at which the first retarding force provided by the force limiter is reached.

Figure 2:
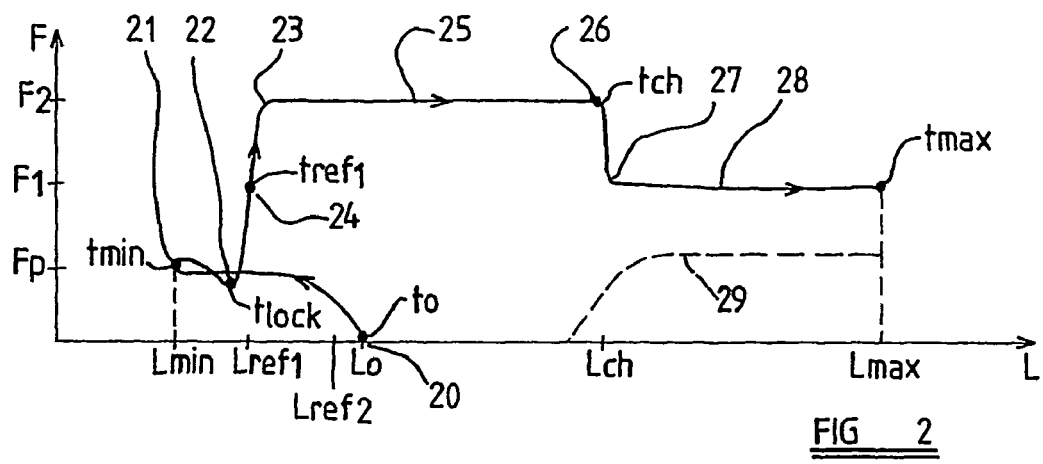
FIG. 2 is a graphical figure showing a plot of force applied to a safety-belt against the length of belt withdrawn for a typical person provided for purposes of explanation.
Figure 3:
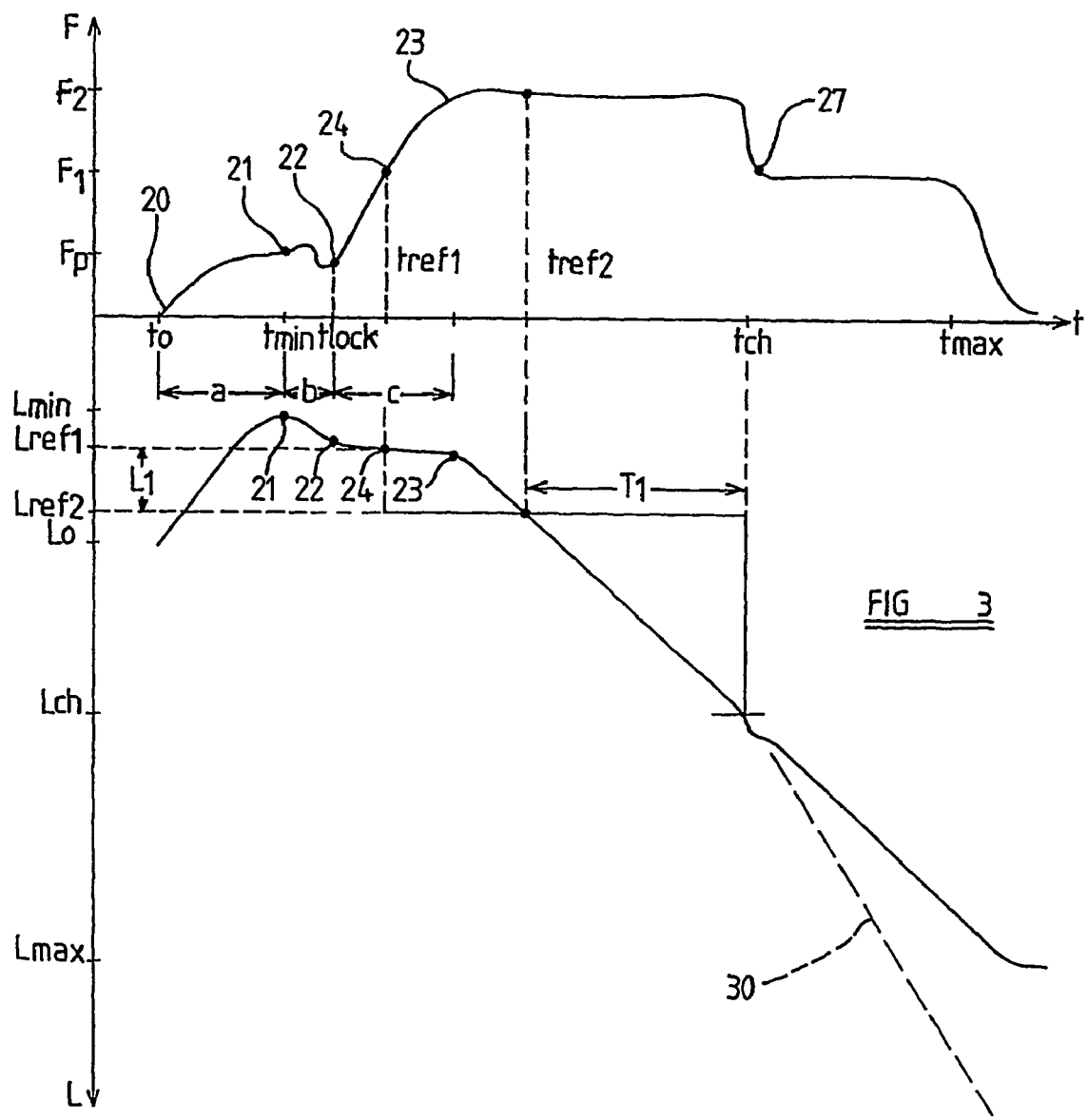
FIG. 3 is a graphical figure showing a plot of force applied to a safety-belt and length of belt extracted against time for a situation equivalent to that shown in FIG. 1.

Referring now to FIGS. 2 and 3, which is a graphical figure, the operation of the safety-belt arrangement of FIG. 1 in a typical accident for a person of typical or normal weight will be described. The graph of FIG. 2 is a plot of the force of the force limiting effect as plotted against the length of safety-belt withdrawn from the retractor. The graph of FIG. 3 is a plot of force and length of safety-belt withdrawn against time.

It can be seen that there are two predetermined retarding forces shown on the graph $F_1$ and $F_2$, the force $F_2$ being greater than the force $F_1$. These forces may, by way of example, be considered to be the forces provided by the torsion bar or the torsion tube, respectively, of an arrangement as shown in WO 9749583-A.

The accident situation commences at point 20 on the graph. At this stage a predetermined length of safety-belt has been withdrawn from the retractor. This is the length of safety-belt withdrawn as the occupant places the safety-belt in the position illustrated in FIG. 1. In this example this length of safety-belt is the length of safety-belt ordinarily deployed when the occupant who is of normal or typical size, is sitting comfortably in an upright position, and is identified as $L_O$. When an accident, or potential accident situation is sensed by the accelerometer 13, for example, when the change in velocity of the vehicle exceeds a predetermined threshold, at time $t_0$, a signal from the control unit 12 is passed to the pretensioner 9 which is activated to wind in safety-belt on to the spool of the retractor 8. The spool of the retractor thus rotates and the safety-belt is wound in, against a gently increasing resistive force which gradually rises to a level $F_p$ until the point 21 is reached, when the safety-belt is fully tight around the occupant. The length of belt withdrawn from the retractor is now at a minimum $L_{min}$. The time is now $t_{min}$. The period of time between $t_0$ and $t_{min}$ is a as shown in FIG. 3. This time period represents the time taken for the pretensioner to pretension the webbing. For the purposes of explanation, it will be assumed that the accident sensed by the accelerometer 13 is an initial impact with the side of the road or a crash barrier. The deceleration of the chassis of the vehicle is only very small, and thus the occupant does not move forward, relative to the chassis, by any noticeable distance as a consequence of the impact with the side of the road or the crash barrier. However, since the accident has been sensed by the accelerometer, the safety-belt has been tensioned by the pretensioner, and the occupant has been pulled backwardly, relative to the chassis, by the pre-tensioner.

When the pre-tensioner has finished pulling the webbing strap, the tension force on the webbing will reduce and, due to the elasticity of the webbing strap, and also due to the elasticity of the clothes and body of the occupant, webbing will be paid-out. Thus, clothes of the occupant which were initially compressed during the pre-tensioning phase may now re-expand. Thus the length of safety-belt paid-out increases while the tension force on the safety-belt reduces.

As the webbing is paid-out, the locking mechanism of the retractor will operate, and the retractor will become locked at time $t_{lock}$ as shown at point 22 in FIG. 2. The period of time running from $t_{min}$ to $t_{lock}$ has a duration b as shown in FIG. 3.

At time instant $t_{lock}$, the retractor becomes locked by the locking mechanism that forms part of the retractor. Typically $t_{lock}$ may be 15 to 19 ms after $t_o$. The precise time period between $t_o$ and $t_{lock}$ may depend upon factors such as variations in the weight of the seat occupant, or the severity of the accident, but mainly upon the specific design and functions of the pre-tensioner.

$t_{lock}$ may occur shortly before, simultaneously with, or shortly after the main impact of the accident presently being considered. During this main impact the chassis of the vehicle is subjected to severe deceleration, and possibly also acceleration in the rearward direction, especially if the impact is an impact with a high speed vehicle travelling in the opposite direction.

During this phase of the accident, the webbing of the safety-belt acts to decelerate the occupant, and possibly acts to accelerate the occupant rearwardly, depending upon the movement of the chassis. During this phase the force in the webbing is increased until the force reaches the higher level $F_2$. When the force reaches the level $F_2$, the force limiter starts to pay-out webbing.

The rate at which the webbing is paid-out is related to the integral of the relative acceleration ($a_{rel}$) between the chassis and the occupant. The relative acceleration ($a_{rel}$) is the difference between the acceleration of the chassis ($a_c$) and the acceleration of the occupant ($a_o$). Thus:

$$a_{rel} = a_c - a_o.$$

The acceleration of the chassis is greater than or equal to the acceleration of the occupant. The acceleration of the occupant is related to the force level $F_2$ divided by the mass of the occupant. If the mass of the occupant is large, $a_0$ may be small, but $a_{rel}$ may be large. Thus, typically webbing is paid-out at a higher rate for a heavier occupant.

The time period between $t_{lock}$ and the point where the resistive force $F_2$ is reached, point 23 as shown on the graph, has a duration c, and this time period is normally between 10 and 25 ms. This variation in time is typically due to the weight of the occupant, and the precise nature of the crash pulse, that is to say the period of time between the first impact and the main impact in the accident situation being considered, and also the degree of deceleration or rearward acceleration applied to the chassis to the vehicle in the particular crash situation.

It is thus to be understood that the period of time between $t_{lock}$ and the point 23, when the force $F_2$ is provided by the force limiter may, depending upon the precise circumstances, have a very different duration, with a short period of 10 ms being experienced in some situations, and a period of 100 ms being experienced in other situations.

During this phase, $t_{lock}$ and point 23, however, the occupant of the seat will only move forwardly very little, and mainly due to the elasticity of the webbing of the safety-belt.

The time when to change the force level of the force provided by the force limiter from the initial high value $F_2$ to a lower value $F_1$ can be determined in different ways. To make the force limiter adaptive to weight of occupant, the length of safety-belt paid-out before change of force level should be longer for a heavy person, and shorter for a light person.

This could be achieved by changing the force level a predetermined time $T_1$ after a reference $t_{ref2}$ related to the point 23, where the first force level is reached.

The point 23 could be indicated by the sensor 14 which senses when force $F_2$ is reached.

The time period $T_1$ could start at point 23, but if a predetermined length $L_1$ is added before the start of $T_1$, the energy absorbed could be better adjusted to a desired dependence between energy absorbed and weight of occupant.

If, however, a certain length $L_1$ after point 23 is desired, then the measuring of this length could start any time between $t_{lock}$ at 22 and point 23. Such a reference, $t_{ref1}$, could be found in a way that will now be described.

During this phase, that is to say during the phase of movement with elastic stretching of the webbing following locking of the spool at point 22, and before the occupant of the seat has stretched the webbing to such an extent that the full resistive for $F_2$ of the force-limiter is experienced at point 23, the sensor which senses the length of safety-belt that has been paid-out, takes a reference measurement at time $t_{ref1}$ and effectively measures or sets a reference length of safety-belt that has been paid-out $L_{ref1}$. This reference length is used as a start point when measuring the length $L_1$ of belt to be paid-out against a specific resistive force $F_2$ as will now be described.

The point at which the reference measurement is made is shown as point 24 on the graph of FIG. 2. In making the measurement, $t_{ref1}$ to be a selected period of time, preferably within the time period of 20–30 ms, after $t_0$ to ensure that the time $t_{ref1}$ will actually be in the time period c following $t_{lock}$, or, alternatively, the measurement at time $t_{ref1}$ may be made in response to locking of the retractor reel.

If the occupant then moves forwardly, after the point 23 on the graph is reached, the resistive force $F_2$ is experienced as the webbing strap of the safety-belt is paid-out This is shown by the horizontal line 25 of the graph.

After a predetermined length $L_1$ of safety-belt has been paid-out, as measured from the reference length, $L_{ref1}$, as shown at point $L_{ref2}$ on the graph, identified as $L_{ch}$, is reached when the force limiter 10 no longer provides the high resistive force $F_2$, but instead provides the lower resistive force $F_1$, as shown at point 27 on the graph. This can be visualised as changing from the torsion bar to the torsion tube of the arrangement of WO 9749583-A. Continued forward movement of the occupant is then effected against the much lower resistive force as shown at line 28. In a typical case, during this phase of movement of the occupant of the seat, energy is also being absorbed, as shown in phantom at line 29, by an inflating air-bag.

It is to be appreciated that the change of the force level of the force limiter occurs when a certain amount of safety-belt has been paid-out, from the measured length $L_{ref}$ and thus occurs when a certain amount of energy has been absorbed.

The energy absorbed is related to the length of belt withdrawn multiplied by the force.

The safety-belt is withdrawn until a maximum extension $L_{max}$ is achieved, at which point all of the kinetic energy of the occupant is absorbed. $L_{max}$ is selected so that the kinetic energy of the occupant is absorbed before the occupant actually reaches the steering wheel or windscreen.

The transition between the high energy absorbing level $F_2$ and the low energy absorbing level $F_1$, as shown at 26 and 27 on the graph, is effected when a predetermined length $L_{ch}$ of safety-belt has been paid out. That predetermined length of safety-belt is determined by $L_1$ and $T_1$.

It is to be appreciated that during the final part of the withdrawal of the safety-belt, the occupant is restrained, not only by the safety-belt but also by the air-bag, and thus the speed of withdrawal of the safety-belt remains substantially constant, and the total retarding force applied to the occupant remains substantially constant. FIG. 3 shows, in phantom, at 30, the situation that would prevail if the air-bag did not inflate.

$L_1$ and $T_1$ may be adjusted in response to sensed crash conditions, such that $L_1$ and $T_1$ are related to the severity of the crash, and thus the described arrangement can provide an optimum effect. Thus, the control unit 12 will determine when a predetermined length ($L_1$) of safety belt has been paid out following $t_{ref1}$ which is very shortly after locking of the retractor reel and will then start an internal timer which times a predetermined time period ($T_1$) so that the control signal that causes the change of the resistive force from the higher level $F_2$ to the lower level $F_1$.

Figure 4:
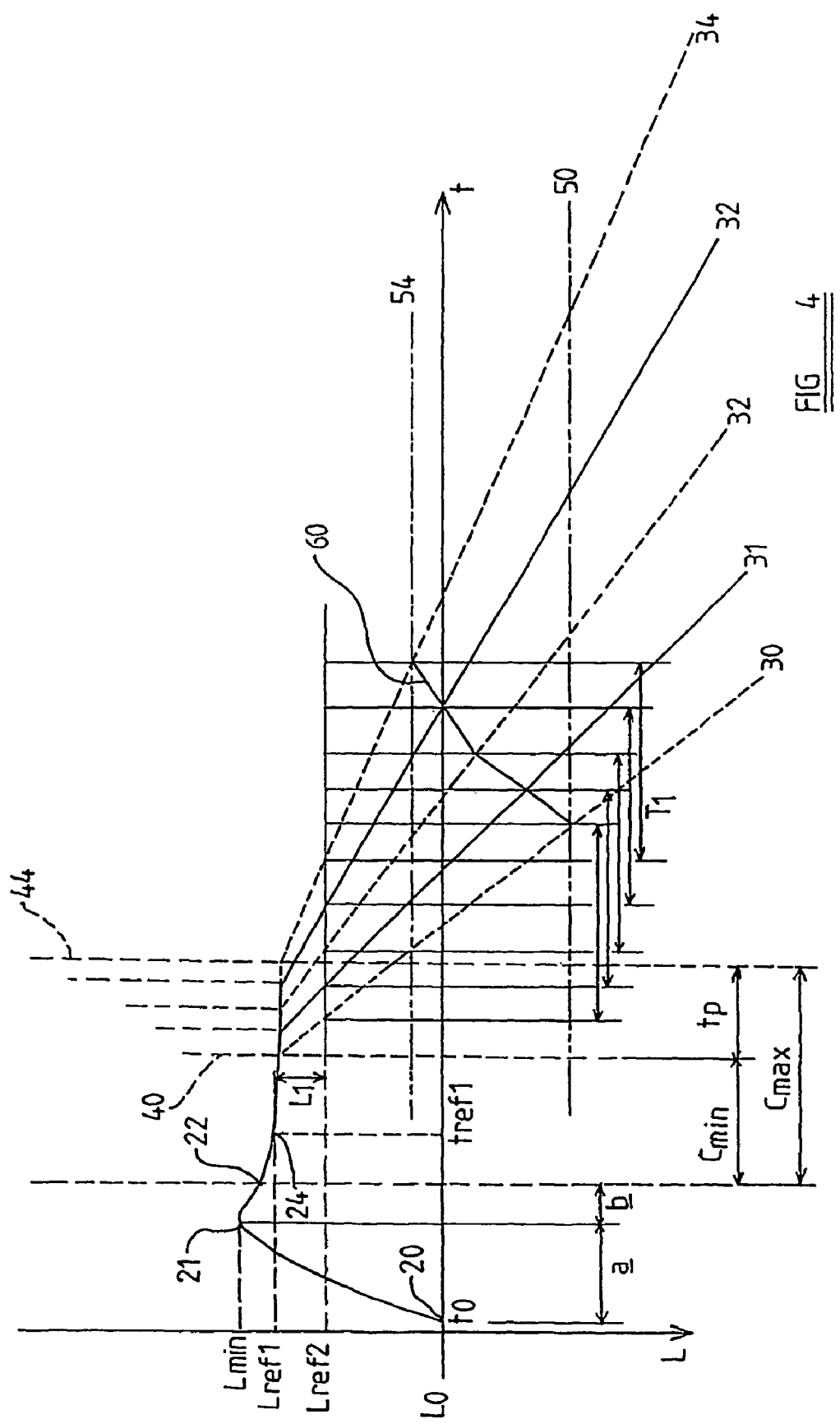
FIG. 4 is a further graphical figure corresponding to FIG. 3, but showing a more detailed plot of length of belt extracted against time.

FIG. 4 shows for a given severity of crash the length of safety-belt withdrawn from the retractor reel plotted against time, and corresponding to the lower part of FIG. 3, but showing alternatives for different weights of occupant. The length of safety-belt withdrawn from the retractor falls following the commencement of the accident at $t_0$ at point 20 on the graph. At point 21 the safety-belt is fully tight around the occupant of the vehicle, and the time period having duration a concludes and the time period having duration b begins. During this time period the occupant may move forwardly slightly in the seat and the time period ends at point 22 on the graph as the retractor reel locks at $t_{lock}$. During the period of time following $t_{lock}$ the occupant continues to be pushed forwardly applying tension to the webbing against a restraining force that rises to the level $F_2$ during the time period that has a duration c. This time period is relatively short for a heavy person, as exemplified by line 30, the time period being about 10 ms, as the high restraining force is reached quickly following the locking of the retractor. The time period c for the heavy person identified by line 30 terminates as shown by line 40, and then the safety-belt is pulled out against the retarding force $F_2$ and is identified as $C_{min}$. The line 50 shows the desired length $L_{ch}$ for a heavy person.

Looking now at the example of a light person, as indicated by the line 34, it can be seen that the time period that has the duration c is relatively long, and does not end until the point indicated by the line 44. This time period is identified as $C_{max}$. The line 54 shows the desired length $L_{ch}$ for a light person.

The instant when the force limiter provides the force $F_2$ can occur at any time during the period $t_p$, which is the period between the end of $C_{min}$ and the end of $C_{max}$, and depends on various parameters including the weight of the occupant of the seat.

It can be seen that if the time is measured between the point at which a predetermined length of safety-belt $L_1$ after $L_{ref}$ has been withdrawn, until the line representing the desired length $L_{ch}$ is reached, in each case the time is the same, namely $T_1$. It can also be seen that the same effect is observed for occupants of decreasing weight as indicated successively by the lines 31, 32 and 33. The desired length $L_{ch}$ for each example are shown to be interconnected by the line 60.

Thus, at least to a good approximation, the length $L_{ch}$ is reached after a first predetermined length $L_1$ of safety belt has been withdrawn, and a further length of belt has been withdrawn during a time period $T_1$. Consequently by determining when the length $L_1$ of safety-belt has been withdrawn, by determining $t_{ref1}$ and then measuring the length of safety-belt as it is withdrawn from the retractor, and then measuring the time $T_1$, to generate the control signal to effect the change of the resistive force it is not necessary to effect any measurement of any parameter of the occupant related to the size of the occupant, thus minimising the number of sensors that need to be provided.

The pay-out rate will also be higher for a more sever crash, which makes the system adaptive to the severity of the crash. If selected adaptivity for weight and crash severity is desired the precise values of $L_1$ and $T_1$ may be varied in dependence on the sensed severity of the crash.

Whilst embodiments have been disclosed in which the force limit level can be changed between two discrete levels, it is to be understood that the force limit level can be changed between a plurality of discrete levels. It is to be appreciated that the force limit level actually exhibited by the force limiter may be determined as a function of the crash severity. Thus, in a very severe accident, an initial force limit level may be adopted which is a very high level, which can be visualised as using simultaneously both the torsion bar and the torsion tube of WO 9749583-A.

Thus, in the example given, an occupant of a seat may be assessed as being "light", "normal weight" or "heavy", and the described arrangement will then function in the appropriate manner.

In the present Specification "comprises" means "includes or consists of" and "comprising" means "including or consists of".

The invention claimed is:

1. A safety-belt arrangement for use in a motor-vehicle, the safety-belt arrangement comprising a safety-belt, one end of which is connected to a retractor, a sensor adapted to generate a signal representative of the amount of the safety-belt paid-out from the retractor, a force limiter associated with the retractor adapted to permit the safety-belt to be paid-out with a variable force limiting effect, means to change the level of force applied by the force limiter, between a first level of resistive force and a second level of resistive force, and a control unit to generate an output signal to control the means which change the level of force, the arrangement determining a reference point either by measuring a period of time following sensing of a predetermined parameter relating to a crash, and then determining when a specific length of safety-belt has been paid out, or by sensing when the first level of resistive force is supplied by the force limiter and optionally then determining when a predetermined length of safety-belt has been paid-out and, after the reference point has been determined, measuring a predetermined period of time after the reference point has been reached before said output signal is generated.

2. An arrangement according to claim 1 wherein the retractor incorporates a pretensioner.

3. An arrangement according to claim 1 wherein means responsive to the tension present in the safety-belt are provided to determine the instant when the force limiter begins to provide the first level of resistive force.

4. An arrangement according to claim 1 wherein means responsive to a predetermined movement of components in the force limiter are provided to determine the instant when the force limiter begins to provide the first level of resistive force.

5. An arrangement according to claim 4 wherein the force limiter is a torsion element force limiter and the determining means determine when a torsion element in the force limiter yields.

6. An arrangement according to claim 1 wherein the reference point is determined by sensing when the first level of resistive force is applied by the force limiter, and then determining when a predetermined length of safety-belt has been paid-out.

7. An arrangement according to claim 6 wherein an additional sensor is provided to determine the severity of the crash and the magnitude of the predetermined length of safety-belt is selected in dependence on the sensed severity of the crash.

8. An arrangement according to claim 1 wherein an additional sensor is provided to determine the severity of the crash and the magnitude of the predetermined period of time is selected in dependence on the sensed severity of the crash.

9. A safety-belt arrangement for use in a motor vehicle, the safety belt arrangement comprising:
a safety-belt having an end;
a retractor capable of paying out the safety belt, the end of the safety-belt connected to the retractor;
a first sensor capable of generating a signal representative of an amount of the safety-belt paid-out from the retractor;
a force limiter associated with the retractor, the force limiter permitting the safety-belt to be paid-out with a variable force limiting effect, the force limiter having a torsion element for changing the level of force applied by the force limiter between a first level of resistive force and a second level of resistive force; and
a control unit capable of generating an output signal to control the torsion element;
wherein the arrangement is capable of determining a reference point in a series of collision events, and after the reference point has been determined, the arrangement is capable of measuring a predetermined period of time after the reference point has been reached before the output signal is generated.

10. An arrangement according to claim 9, wherein the reference point is determined by measuring a period of time following sensing a predetermined parameter relating to a crash and then determining when a specific length of safety-belt has been paid out.

11. An arrangement according to claim 9, wherein the reference point is determined by sensing when the first level of resistive force is supplied by the force limiter.

12. An arrangement according to claim 11, wherein the arrangement is capable of determining when a predetermined length of safety-belt has been paid-out after sensing when the first level of resistive force is supplied by the force limiter.

13. An arrangement according to claim 11, further comprising a second sensor capable of responding to tension present in the safety-belt, the second sensor thereby able to determine the instant when the force limiter begins to provide the first level of resistive force.

14. An arrangement according to claim 11, further comprising a second sensor capable of responding to a predetermined movement of components in the force limiter, the second sensor thereby able to determine when the force limiter begins to provide the first level of resistive force.

15. An arrangement according to claim 14, wherein the second sensor is able to detect when the torsion element in the force limiter yields.

16. An arrangement according to claim 11, further comprising a second sensor capable of responding to a predetermined pay-out rate of the safety-belt, the second sensor thereby able to determine when the force limiter begins to provide the first level of resistive force.

* * * * *